(12) United States Patent
Ganapathi et al.

(10) Patent No.: US 7,373,843 B2
(45) Date of Patent: May 20, 2008

(54) FLEXIBLE IMAGING PRESSURE SENSOR

(75) Inventors: Srinivasan K. Ganapathi, Fremont, CA (US); Keith T. DeConde, San Jose, CA (US); Randolph S. Gluck, San Jose, CA (US)

(73) Assignee: Fidelica Microsystems, Milpitas, CA (US)

( * ) Notice: Subject to any disclaimer, the term of this patent is extended or adjusted under 35 U.S.C. 154(b) by 171 days.

(21) Appl. No.: 11/145,534

(22) Filed: Jun. 2, 2005

(65) Prior Publication Data

US 2006/0272429 A1    Dec. 7, 2006

(51) Int. Cl.
    G01D 7/00    (2006.01)
(52) U.S. Cl. ............... 73/862.046; 73/862.041; 73/862.042; 73/862.043; 73/862.044; 73/862.045
(58) Field of Classification Search ............... 73/862.041–862.046
    See application file for complete search history.

(56) References Cited

U.S. PATENT DOCUMENTS

| | | | |
|---|---|---|---|
| 4,428,670 A | 1/1984 | Ruell et al. ............ 356/71 |
| 4,429,413 A | 1/1984 | Edwards ............ 382/4 |
| 4,577,345 A | 3/1986 | Abramov ............ 382/4 |
| 5,079,949 A | 1/1992 | Tamori ............ 73/172 |
| 5,400,662 A * | 3/1995 | Tamori ............ 73/862.046 |
| 5,429,006 A * | 7/1995 | Tamori ............ 73/862.046 |
| 5,745,046 A * | 4/1998 | Itsumi et al. ............ 340/5.83 |
| 5,844,287 A * | 12/1998 | Hassan et al. ............ 257/419 |
| 6,578,436 B1 | 6/2003 | Ganapathi et al. ..... 73/862.046 |
| 6,661,019 B2 * | 12/2003 | Furusato et al. ............ 250/556 |
| 6,672,174 B2 | 1/2004 | Deconde et al. ....... 73/862.046 |
| 6,680,485 B1 * | 1/2004 | Carey et al. ............ 257/57 |
| 6,694,269 B2 | 2/2004 | Hayes et al. ............ 702/57 |
| 6,862,942 B2 * | 3/2005 | Kawahata ............ 73/862.046 |
| 6,889,565 B2 * | 5/2005 | DeConde et al. ...... 73/862.042 |
| 6,993,980 B2 * | 2/2006 | Shimizu et al. ....... 73/862.046 |
| 2002/0121145 A1 | 9/2002 | DeConde et al. ...... 73/862.046 |
| 2006/0273417 A1 * | 12/2006 | Ganapathi ............ 257/415 |

OTHER PUBLICATIONS

Jonathan Engel et al., "Development of polyimide flexible tactile sensor skin," Journal of Micromechanics and Microengineering 13 (2003) 359-366.
N. D. Young et al., "Novel Fingerprint Scanning Arrays Using Polysilicon TFT's on Glass and Polymer Substrates," IEEE Electron Device Letters, vol. 18, No. 1, Jan. 1997.

* cited by examiner

Primary Examiner—Edward Lefkowitz
Assistant Examiner—Freddie Kirkland, III
(74) Attorney, Agent, or Firm—Lumen Patent Firm, Inc.

(57) ABSTRACT

A sensor for a textured surface (e.g., a fingerprint) is provided. The sensor includes a flexible substrate and a flexible membrane supported above the substrate by one or more spacers. The sensor also includes multiple pressure sensor elements responsive to a separation between parts of the membrane and corresponding parts of the substrate. The membrane is conformable to the textured surface being sensed, so the variation in separation between substrate and membrane is representative of the textured surface being sensed. A preferred sensor array arrangement has a set of parallel substrate electrodes on the substrate facing the membrane and a set of parallel membrane electrodes on the membrane facing the substrate, where the substrate and membrane electrodes are perpendicular. The sensor array is preferably an entirely passive structure including no active electrical devices, to reduce cost. Row and column addressing circuitry can be provided as separate units (e.g., ASIC chips) to be hybrid integrated with the sensor array.

42 Claims, 7 Drawing Sheets

FLEXIBLE IMAGING PRESSURE SENSOR

FIELD OF THE INVENTION

This invention relates to pressure sensors for providing a tactile image of a textured surface, such as a fingerprint.

BACKGROUND

Security and identification often relies on fingerprint data. Accordingly, sensors for providing fingerprint images have been under development for some time. Many such sensors employ an array of sensor pixels making direct contact with a finger. Readout of the sensor pixels provides fingerprint image data. Known approaches for providing such sensor pixels include capacitive sensing (e.g., as in U.S. Pat. No. 6,694,269), and temperature or pressure sensing (e.g., as in U.S. Pat. No. 4,429,413). Further references relating to pressure sensing include: U.S. Pat. No. 5,844,287, U.S. Pat. No. 6,672,174, U.S. Pat. No. 6,578,436, and US 2002/0121145.

In many cases, sensors based on pressure sensing include a flexible membrane that conforms to the valleys and ridges of an applied fingerprint. The membrane is typically suspended above a rigid substrate that provides mechanical support. Each sensor pixel is responsive to a separation between the membrane and substrate. The substrate often includes integrated electronic circuitry (e.g., pixel addressing circuitry). Known examples of this general approach include: U.S. Pat. No. 4,577,345, U.S. Pat. No. 5,745,046, U.S. Pat. No. 5,400,662, and U.S. Pat. No. 5,079,949. In practice, implementation of such sensor approaches is often excessively costly. A typical integrated fingerprint sensor chip dimension is 15 mm×15 mm to accommodate the size of a normal fingerprint and the area of the integrated processing circuitry. Such large chips are costly to fabricate, since the number of chips per semiconductor wafer is relatively low. Furthermore, sensors having rigid and breakable substrates (e.g., conventional silicon substrates) cannot be used for applications such as smart credit/identity cards where the sensor must survive a certain degree of flexure.

Another sensor approach is considered in an article by Young et al., entitled "Novel Fingerprint Scanning Arrays Using Polysilicon TFTs on Glass and Polymer Substrates", and published in IEEE Electron Device Letters 18(1), pp 19-20, January 1997. In this work, the substrate is flexible, alleviating the above-mentioned breakage problem, and capacitive sensing is employed. Since capacitive sensing entails no significant relative motion of sensor parts in operation, mechanical complications resulting from substrate flexure are presumably avoided. However, the capacitive sensing in this work relies on integrated thin film transistors to amplify signals. Although thin film transistors deposited on flexible substrates are known (e.g., as in U.S. Pat. No. 6,680,485), it would be preferable to avoid the use of active devices integrated with the sensor array in order to reduce cost. In addition, the polymeric transistors used in such works can be unreliable in commonly encountered environmental conditions such as high humidity (which causes polymer transistor degradation). Furthermore, the fabrication of more traditional transistors, such as thin film transistors, requires exposure of the substrate to high temperatures during processing, which can cause degradation of typical polymer based flexible substrates.

Another flexible sensor is considered in an article by Engel et al., entitled "Development of polyimide flexible tactile sensor skin", and published in the Journal of Micromechanics and Microengineering, 13, pp 359-366, 2003. In this work, each pixel includes a relatively thin membrane that flexes (or doesn't flex) responsive to the presence (or absence) of a fingerprint ridge. Flexure of the membrane is sensed by a strain gauge integrated with the membrane. Since the strain gauge is in the membrane, the substrate is not a functional part of each pixel. Instead, the substrate provides overall mechanical support, and may include circuitry for reading out the sensor array. A disadvantage of this approach is that the strain gauge output is analog. It is often preferred for fingerprint sensors to provide inherently digital outputs, since a digital image is often required in practice and post-conversion of an analog sensor image to a binary image is frequently error-prone.

Accordingly, it would be an advance in the art to provide a flexible fingerprint sensor overcoming the above-identified shortcomings. More specifically, a flexible fingerprint sensor providing an inherently binary output would be an advance in the art. A further advance in the art would be a flexible fingerprint sensor providing an inherently binary output and having only passive components in the sensor array.

SUMMARY

The present invention provides a sensor for a textured surface (e.g., a fingerprint). The sensor includes a flexible substrate and a flexible membrane supported above the substrate by one or more spacers. The sensor also includes multiple pressure sensor elements responsive to a separation between parts of the membrane and corresponding parts of the substrate. The membrane is conformable to the textured surface being sensed, so the variation in separation between substrate and membrane is representative of the textured surface being sensed. A preferred sensor array arrangement has a set of parallel substrate electrodes on the substrate facing the membrane and a set of parallel membrane electrodes on the membrane facing the substrate, where the substrate and membrane electrodes are perpendicular to each other. The sensor array is preferably an entirely passive structure including no active electrical devices, to reduce cost. Row and column addressing circuitry can be provided as separate units (e.g., ASIC chips) to be hybrid integrated with the sensor array.

The present invention provides several significant advantages. The flexibility of the substrate permits sensors according to the invention to be used in applications where rigid sensors would break, such as credit card and identity card applications. The flexible substrate also permits high-volume fabrication methods (e.g., roll-level processing), to reduce cost. In preferred embodiments where the substrate and membrane define a switch array, the sensor output is advantageously an inherently binary signal corresponding to whether or not the relevant switch is open or closed. Here a switch is regarded as any structure having an electrical resistance responsive to a mechanical input (e.g., having movable electrical contacts, including a pressure sensitive resistor, etc.).

DETAILED DESCRIPTION

Figure 1A:
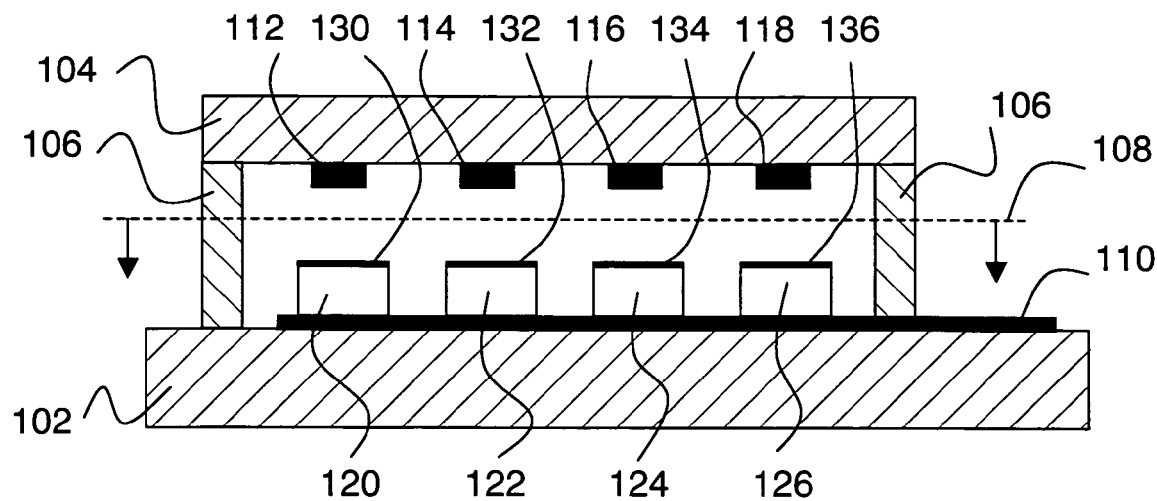
FIGS. 1a-b show cutaway side and top views, respectively, of an embodiment of the invention.
Figure 1B:
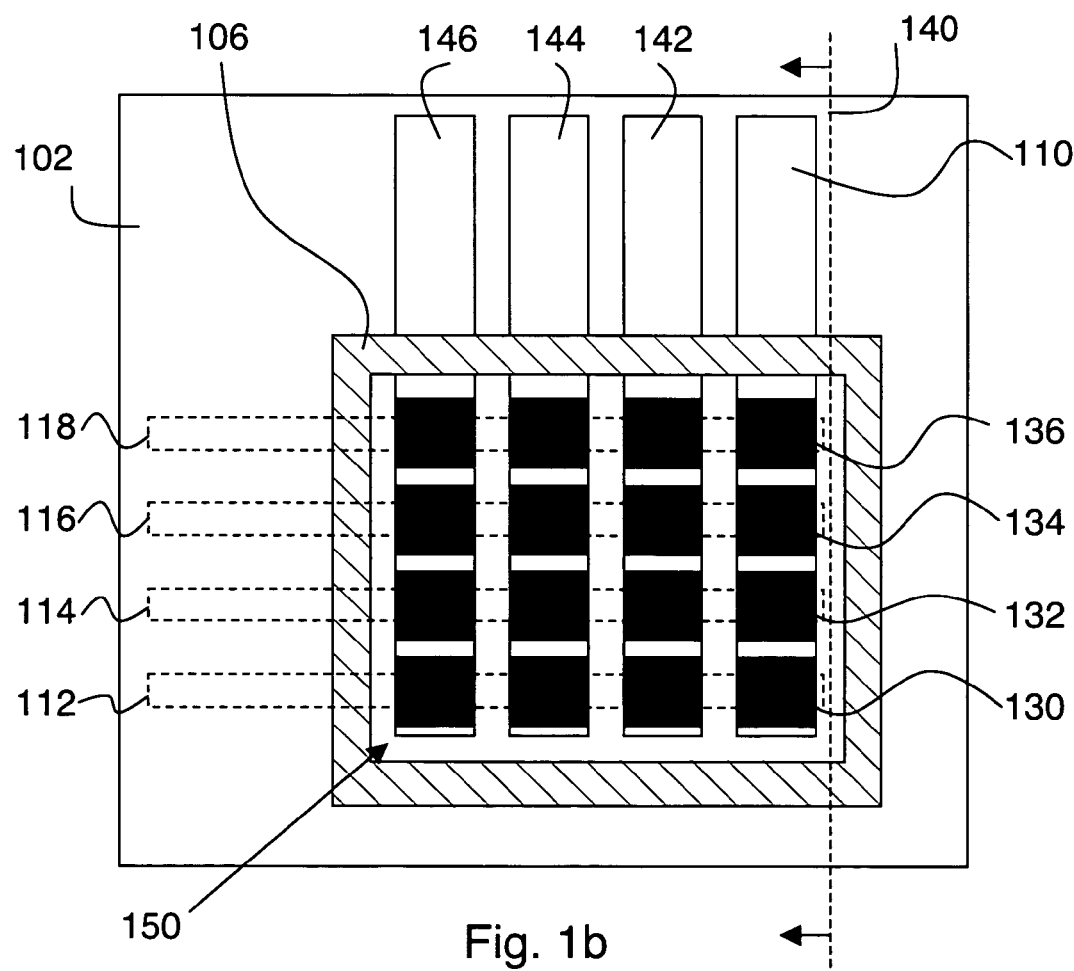

FIGS. 1a-b show cutaway side and top views, respectively, of an embodiment of the invention. More specifically, FIG. 1a shows a cutaway view along line 140 on FIG. 1b, and FIG. 1b shows a cutaway view along line 108 on FIG. 1a. A flexible substrate 102 and a flexible membrane 104 are connected to a spacer 106. Membrane 104 is conformable to a textured surface to be sensed (e.g., a fingerprint). A plurality of pressure sensor elements 150 is included, each pressure sensor element being responsive to a separation between part of the membrane and a corresponding part of the substrate. Spacer 106 determines, in part, a nominal separation between membrane 104 and substrate 102 for each pressure sensor element. Here the nominal separation is the separation between membrane and substrate when no textured surface is making contact with the top surface of membrane 104. As used herein, "flexible" is taken to refer to materials or structures having a Young's modulus of less than 25 GPa. For structures including multiple material compositions (e.g., a multi-layer laminate), the smallest Young's modulus of the materials in the structure is regarded as the Young's modulus of the structure.

Suitable materials for substrate 102 include, but are not limited to: polyimides, aromatic fluorine polyesters, polyethersulfone, polysulfones, polyacrylates, polycarbonates, polyetheretherketone, polyethylene naphthalate (PEN), blocked isocyanates, silicone based elastomers, polyamides, polyether imides, polymethacrylates, polyolefins, poly(ethylene-acrylate) copolymers, poly(ethylene-methacrylate) copolymers, polyethylene terephthalate (PET), polynaphthalene terephthalate, polydienes, poly(styrene-diene) block copolymers, poly(vinyl halides), polyurethanes, poly(urethane acrylates), poly(urethane methacrylates), poly(dimethyl siloxanes), and ionomers. The substrate material preferably remains flat during and after various processing steps, such as metallization and etching. Thermal stability, low moisture uptake and chemical resistance of the substrate are also preferred. In some fingerprinting applications, polyimides (e.g., Kapton®), PEN and PET are preferred substrate materials.

Suitable materials for membrane 104 include, but are not limited to: polyimides, aromatic fluorine polyesters, polyethersulfone, polysulfones, polyacrylates, polycarbonates, polyetheretherketone, polyethylene naphthalate (PEN), blocked isocyanates, silicone based elastomers, polyamides, polyether imides, polymethacrylates, polyolefins, poly(ethylene-acrylate) copolymers, poly(ethylene-methacrylate) copolymers, polyethylene terephthalate (PET), polynaphthalene terephthalate, polydienes, poly(styrene-diene) block copolymers, poly(vinyl halides), polyurethanes, poly(urethane acrylates), poly(urethane methacrylates), poly(dimethyl siloxanes), and ionomers. In some fingerprinting applications, polyimides (e.g., Kapton®), PEN and PET are preferred membrane materials.

Suitable materials for spacer 106 include, but are not limited to: silicones, polyurethanes, polyamides, polyimides, polyacrylates, polymethacrylates, poly(glycidyl ethers), poly(ethylene-acrylate) copolymers, poly(ethylene-methacrylate) copolymers, polydienes, poly(styrene-diene) block copolymers, poly(vinyl halides), polyurethanes, poly (urethane acrylates), poly(urethane methacrylates), and poly (dimethyl siloxanes). The spacer is preferably a pressure sensitive or other curable adhesive. The nominal separation between membrane and substrate is preferably as small as possible given other design constraints, in order to reduce flexure distortion and internal pressure variation.

Various arrangements are possible for pressure sensor elements 150. FIGS. 1a-b show a preferred arrangement where a plurality of substantially parallel membrane electrodes 112, 114, 116, and 118 are disposed on the membrane, and a plurality of substantially parallel substrate electrodes 110, 142, 144, and 146 are disposed on the substrate. Preferably the membrane and substrate electrodes are substantially perpendicular to each other, as shown, although they can intersect at any angle. Since the pressure sensor elements are defined by intersections of the membrane and substrate electrodes, row and column addressing of the electrodes can be employed to interrogate each sensor element. Each pressure sensor element can be regarded as including a part of its membrane electrode as a first contact and part of its substrate electrode as a second contact. Gold is a suitable material for the membrane and substrate electrodes, and typical electrode dimensions for fingerprint applications are 15 μm wide, 35 μm spacing and 100 nm thickness. The invention can be practiced with other electrode compositions and dimensions. The invention can be practiced with any number of rows and columns in the pressure sensor element array. An array of 256 rows and 256 columns has been found suitable for fingerprint applications.

The embodiment of FIGS. 1a-b includes several preferred electrical design features. Although embodiments of the invention can have active electrical devices (e.g., transistors) integrated with the sensor array, it is preferable for the sensor array to be entirely passive (i.e., including only resistors, capacitors, inductors or any combination thereof). Thus the pressure sensor elements preferably provide a resistance, a capacitance or an inductance responsive to the separation between substrate and membrane at the location of the sensor element. In this example, resistors such as 120, 122, 124, and 126 are disposed on the substrate electrodes and can make contact with corresponding membrane electrodes when the membrane deforms responsive to an applied fingerprint. Thus the resistance between a row and a column electrode is either very high (corresponding to an open circuit) or relatively low (when contact is made). This arrangement can be regarded as an array of normally-open switches. Preferably, the resistor value is between about 25 kΩ and about 5 MΩ, and is more preferably about 1 MΩ. Suitable materials for these resistors include, but are not limited to: co-sputtered metals and ceramics, tantalum oxide, polysilicon, amorphous silicon, conductive polymer composites, polymer thick film resistors, carbon nanotube composites, composite plastics, composite elastomers, and intrinsically conductive polymers.

It is preferred for the resistors to be wider than the membrane electrodes, as shown on FIGS. 1a-b. This arrangement provides increased tolerance for misalignment of the membrane electrodes relative to the resistors, and thus for the membrane relative to the substrate.

In the case where the sensing element includes an active device, various forms of transistor or diode can be used, such as a p-i-n diode, a thin film transistor, or a polymer transistor. Finally, various combinations of active and passive devices can be employed, such as the case where a resistor is placed in series with a diode or a transistor.

It is also preferred for the pressure sensor elements to have electrical impedances that change by a large percentage between the open and the closed condition, so that simple electronic comparators can be used to provide binary output signals as opposed to analog output signals. In the example of FIGS. 1a-b, the pressure sensor output is binary, since the electrical current measured during addressing of a particular cell exceeds or falls below a certain threshold value, depending on whether or not contact is made between the resistor and the mating electrode. An example of an embodiment providing analog output signals is an arrangement similar to that of FIGS. 1a-b except that capacitance between substrate and membrane is sensed. Such capacitive sensing provides an analog signal, since the capacitance varies continuously as the separation between membrane and substrate varies. For such capacitive sensing, active circuitry integrated with the sensor array, e.g. as described above, in the form of diodes or transistors, is suitable for processing the analog signals.

Although not required, it is also preferred to include contact layers such as 130, 132, 134 and 136 disposed on a surface of resistors 120, 122, 124, and 126 respectively facing membrane 104. The contact layers are preferably gold layers about 100 nm thick, although other compositions (e.g., conductive polymers) and thicknesses can also be employed. With this arrangement, the contact that can be made between substrate and membrane in each sensor element is a gold to gold contact, as opposed to a gold to resistor contact, which improves device reliability. In this example, the resistors are disposed on the substrate electrodes. Alternatively, the resistors can be disposed on the membrane electrodes. In this alternative case, the contact layers are disposed on surfaces of the resistors facing the substrate electrodes. In some embodiments, a contact layer is also provided on top of an electrode surface facing the resistors. For example, the membrane electrodes in FIGS. 1a-b can be covered by corresponding contact layers. Such contact layers can be useful for protecting soft contact materials (e.g., gold) from mechanical wear.

Another preferred electrical design feature of the example of FIGS. 1a-b is the resistor configuration. More specifically, FIGS. 1a-b show vertical resistors through which current flows vertically, normal to the plane of the sensor array, on FIGS. 1a-b. An alternative includes horizontal resistors, in which current flows along the plane of the sensor array, fabricated on the substrate and/or membrane. Each such resistor is connected to a contact at one end and to an electrode at the other end. The contacts allow the opening and closing of the individual switch at the intersection of each row and column electrode pair. In this approach, the vertical resistance of the closed contact is negligible compared to the resistance provided by the horizontal resistor. The vertical resistor configuration of FIGS. 1a-b is preferred because it is easier to fabricate than the horizontal resistor approach.

The embodiment of FIGS. 1a-b also includes several preferred mechanical design features. A first key consideration is balancing the mechanical properties of the membrane and substrate. More specifically, the substrate needs to be flexible enough so that it will not break when affixed to a flexible surface (e.g., a credit card, identity card, etc). The substrate also needs to be stiffer than the membrane to provide mechanical support to the membrane via the spacer. A key parameter is flexural rigidity (D), given by $$D = \frac{Et^3}{12(1-v^2)}, \quad (1)$$

where E is the elastic modulus, v is Poisson's ratio, and t is the film thickness. Since most engineering polymers have 2 GPa$\leq$E$\leq$6 GPa and 0.33$\leq$v$\leq$0.4, the thickness t is the main parameter of interest. The importance of thickness as a design parameter is also enhanced by the cubic dependence of rigidity on thickness.

Another consideration relating to mechanical design is maintaining proper registration between membrane and substrate features as the sensor is flexed or bent during operation. The tensile strain $\epsilon$ in bending is approximately given by $$\varepsilon \propto \left(\frac{F}{Eat}\right)^{2/3}, \quad (2)$$

where F is the applied normal force to a square sensor having sides of length a. For a sensor having a=12.8 mm and 35 μm by 15 μm sensor contacts, the strain $\epsilon$ should not exceed 0.2%.

In view of these considerations, the substrate rigidity $D_S$ is preferably greater than the membrane rigidity $D_M$ (i.e., $D^M<D_S<10^6 D_M$, more preferably 50 $D_M<D_S<500 D_M$). The substrate rigidity $D_S$ is preferably in a range from about $10^{-7}$ N-m to about $10^{-4}$ N-m, and is more preferably in a range from about $10^{-6}$ N-m to about $10^{-5}$ N-m. The membrane rigidity $D_M$ is preferably in a range from about $10^{-11}$ Nm to about $10^{-6}$ N-m and is more preferably in a range from about $10^{-8}$ N-m to about $10^{-6}$ N-m. The gap between membrane and substrate is preferably in a range from about 10 μm to about 150 μm.

In many cases of interest, the substrate and membrane have similar elastic properties. In these cases, preferred mechanical configurations can also be specified in terms of relations between substrate thickness $t_S$ and membrane thickness $t_M$. Preferably, $t_M \leq t_S \leq 1000 t_M$ and more preferably $t_M \leq t_S \leq 10 t_M$. Such thickness relations are also applicable in cases where the substrate and/or membrane are laminates including multiple layers, if the substrate and membrane have comparable flexural rigidities.

Figure 2A:
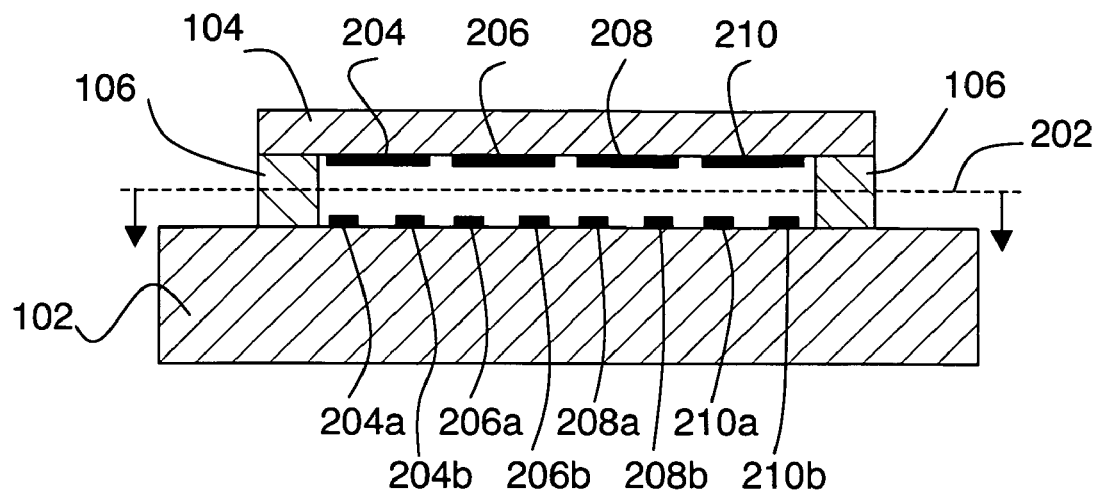
FIGS. 2a-b show cutaway side and top views, respectively, of another embodiment of the invention.
Figure 2B:
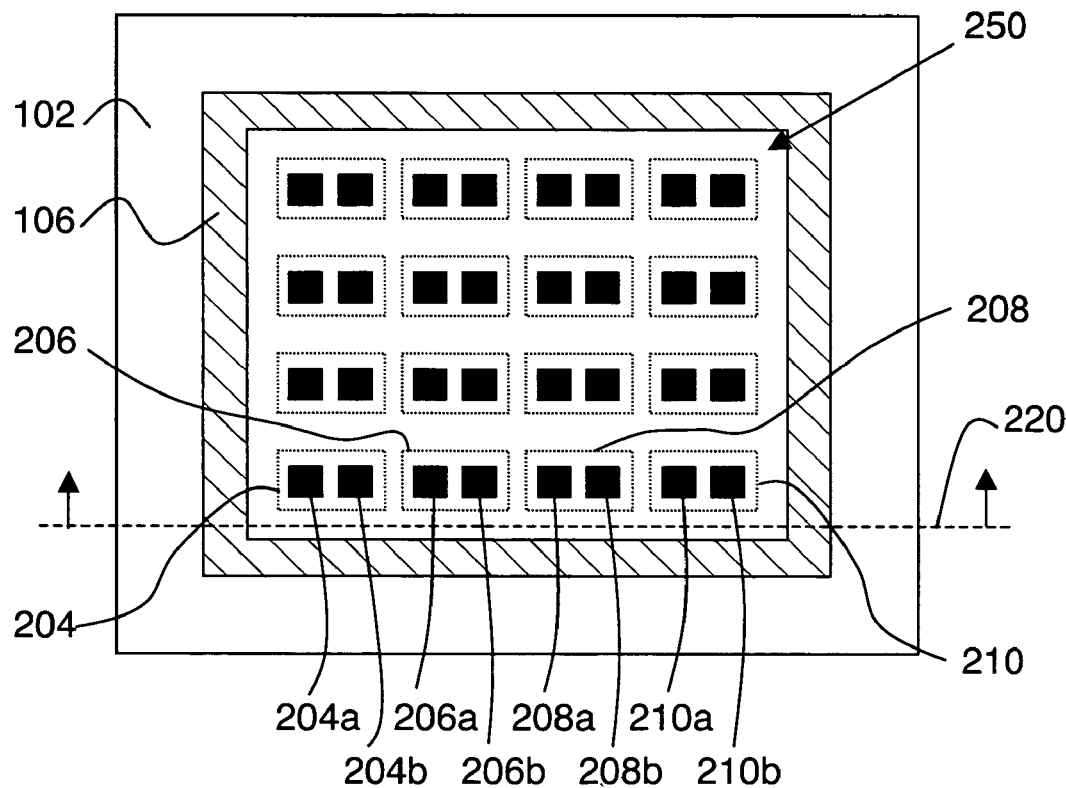

FIGS. 2a-b show cutaway side and top views, respectively, of another embodiment of the invention. More specifically, FIG. 2a shows a cutaway view along line 220 on FIG. 2b, and FIG. 2b shows a cutaway view along line 202 on FIG. 2a. The embodiment of FIGS. 2a-b differs from the embodiment of FIGS. 1a-b in the arrangement of the pressure sensor elements. More specifically, pressure sensor elements 250 on FIGS. 2a-b each include a pair of contact electrodes disposed on the substrate, such as 204a,b, 206a,b, 208a,b and 210a,b and a corresponding electrically conductive region such as 204, 206, 208, and 210 respectively, disposed on the membrane. Operation of the embodiment of FIGS. 2a-b is similar to the operation of the embodiment of FIGS. 1a-b. Localized contact between membrane and substrate closes electrical switches (e.g., electrodes 204a and 204b can be connected by contact from region 204), and the pattern of open and closed switches across the array is representative of the textured surface being sensed. An advantage of the embodiment shown in FIGS. 2a-b is that, for appropriate configuration of electrodes, it does not require a very precise alignment between the membrane and the substrate when the two are bonded together with the spacer in between them. The pressure sensor element arrangements shown in FIGS. 1a-b and 2a-b are two exemplary sensor element arrangements. Any arrangement of any type of pressure sensor element can also be employed in practicing the invention.

In the preceding examples, membrane 104 preferably satisfies multiple constraints. More specifically, a compliant membrane is desirable to provide high-fidelity imaging of a fingerprint image. A rigid membrane is desirable to provide scratch resistance. A highly elastic membrane with high elongation before deformation characteristics is desirable in order to prevent embossing (i.e., plastic deformation), either in operation or as a result of scratch testing. Finally, it is desirable for the membrane to provide ESD protection for other sensor components, which requires electrical conductivity of the membrane. More specifically, the side of the membrane which a user will touch in operation should be electrically conductive. In view of these multiple constraints, membrane 104 is preferably a laminate including multiple layers having different compositions. An example of a preferred membrane laminate follows.

Figure 3:
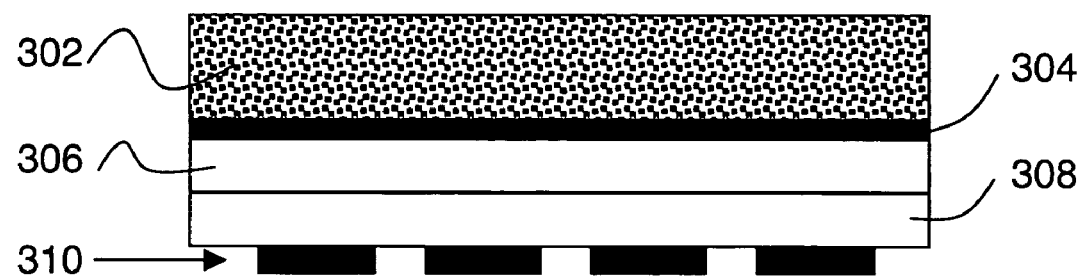
FIG. 3 shows a detailed view of a preferred top membrane suitable for use with the invention.

FIG. 3 shows a detailed view of a preferred top membrane suitable for use with the invention. A top layer 302 is an elastic film having nanoparticle inclusions. The nanoparticles are mechanically hard, and electrically conductive. Top layer 302 preferably has a relatively low coefficient of friction. A thin metallization layer 304 has high electrical conductivity and is electrically grounded to protect other sensor components from ESD. Layer 306 is a relatively stiff polymer layer that provides dimensional stability to the laminate, which is important to maintain feature registration between membrane and substrate. Layer 308 is an elastomer layer resistant to embossing. Membrane electrodes 310 are disposed on layer 308.

The arrangement of FIG. 3 satisfies the above-identified constraints as follows. ESD protection is provided by the combination of grounded and highly conductive layer 304 and conductive layer 302. Embossing is most likely to occur as a result of concentrated forces at the electrodes, so elastomer layer 308 is disposed adjacent to the membrane electrodes. Scratch resistance combined with conformability to a fingerprint pattern is provided by a relatively soft top layer 302 having mechanically hard nanoparticle inclusions. Layer 306 provides mechanical support for the membrane as a whole. Adjustment of the thickness and mechanical properties of layer 306 is a preferred method for designing the flexural rigidity $D_M$ of the laminated membrane in accordance with the above-identified principles.

In some embodiments of the invention, substrate 102 is a multi-layer laminate and/or has particulate inclusions. Such substrates are likely to be suitable in cases where a set of requirements placed on the substrate are difficult to meet with a homogeneous, single-layer structure.

Figure 4:
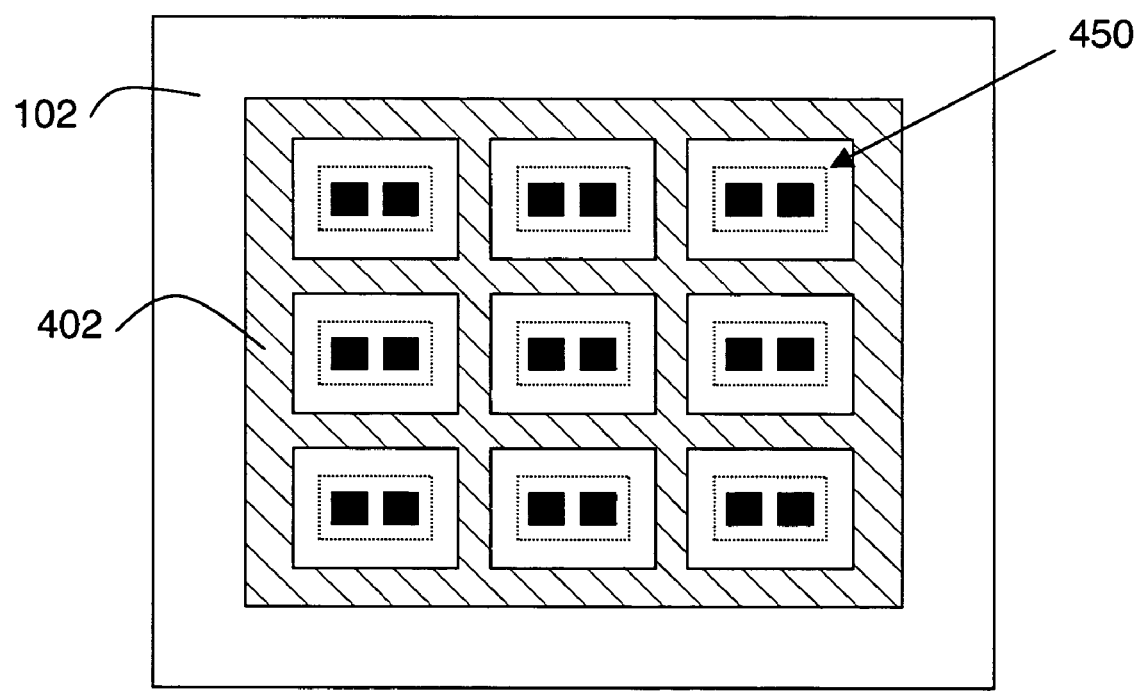
FIG. 4 shows an alternative spacer arrangement for use with the invention.

A preferred arrangement for spacer 106 defines a global cavity including all of the pressure sensor elements, as shown on FIGS. 1a and 2b. Proper mechanical design of flexible substrate 102 combined with flexible membrane 104, as indicated above, enables this global cavity spacer arrangement. Such global cavity arrangements have been found suitable for arrays having a large number of sensors (e.g., 256×256 or even more). FIG. 4 shows an alternative spacer arrangement for use with the invention. Spacer 402 defines a local cavity corresponding to each of pressure sensor elements 450. The invention is not limited to these two exemplary spacer arrangements, and can be practiced with any spacer arrangement that provides a nominal separation between membrane and substrate in the pressure sensor elements. For example, the spacer can define several cavities each including one or more pressure sensor elements. The spacer can also include localized standoffs, each corresponding to one or more pressure sensor elements, for providing a nominal separation between membrane and substrate. An art worker can select a suitable spacer configuration based on the following considerations.

A preferred embodiment of a spacer having local standoffs is where the local standoffs are pressure sensitive resistors. Pressure sensitive resistors have a resistance which depends on applied pressure, and can therefore provide the dual functions of switch element and spacer in embodiments of the invention. For example, a post-shaped pressure-sensitive resistor can be in mechanical contact with both membrane and substrate in a pressure sensor element. When a fingerprint ridge makes contact with this sensor element, the resistor compresses and the resistance can drop below the detection threshold. When a fingerprint valley is aligned with this sensor element, the resistor is not deformed and its resistance is above the threshold.

Figure 8A:
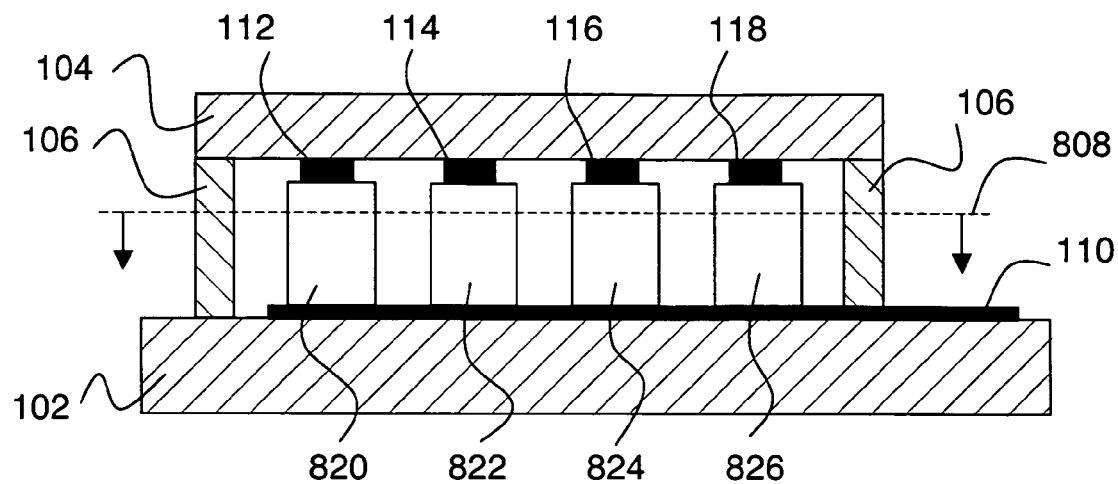
FIGS. 8a-b show cutaway side and top views, respectively, of an embodiment of the invention.
Figure 8B:
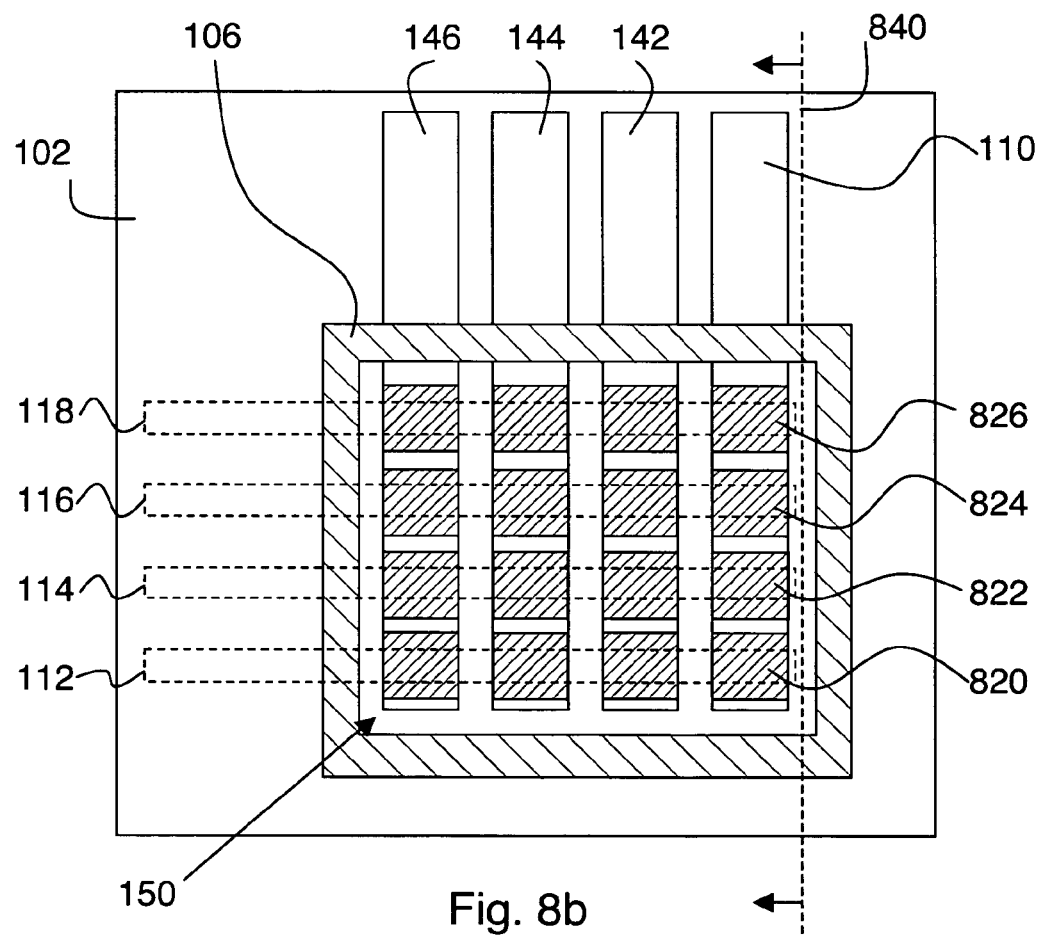

FIGS. 8a-b show cutaway side and top views, respectively, of an embodiment of the invention including pressure sensitive resistors. More specifically, FIG. 8a shows a cutaway view along line 840 on FIG. 8b, and FIG. 8b shows a cutaway view along line 808 on FIG. 8a. This embodiment is similar to the embodiment of FIGS. 1a-b, except that pressure sensitive resistors (e.g., 820, 822, 824, and 826) extend from the substrate electrodes to the membrane electrodes. Here spacer 106 surrounding the pressure sensor elements is preferably present, although it can be omitted.

A global cavity spacer advantageously requires reduced lateral alignment precision of the spacer compared to a local cavity spacer. Reduced alignment precision requirements significantly reduce manufacturing cost. This reduced cost is the main reason a global cavity spacer arrangement is preferred. However, a global cavity spacer configuration places significant demands on the mechanical design of the sensor, since the membrane is only supported at its edges and the substrate is flexible. These mechanical design issues are accounted for in the preceding description.

Figure 5:
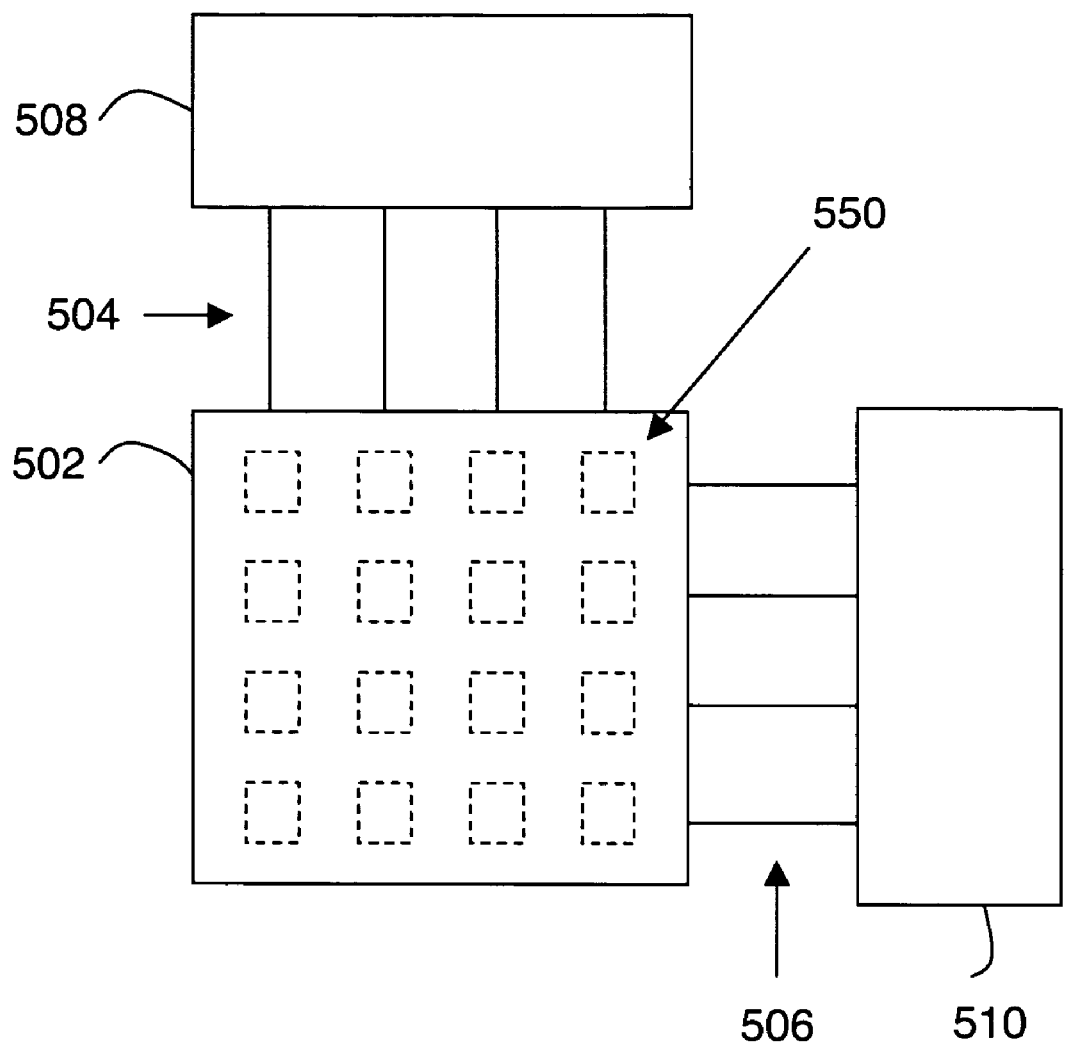
FIG. 5 shows remotely located row and column addressing circuitry for use with the invention.

FIG. 5 shows remotely located row and column addressing circuitry for use with the invention. A sensor 502 having an array of pressure sensor elements 550 is connected to column addressing circuitry 508 by column connections 504. Sensor 502 is also connected to row addressing circuitry 510 by row connections 506. In this exemplary embodiment, sensor 502 can have the configuration shown in FIGS. 1a-b. As indicated above, it is desirable for sensor 502 to be an entirely passive device (i.e., including no active electrical devices such as transistors), in order to reduce the cost of sensor 502.

Row and column addressing circuitry can be connected to such a passive sensor in any convenient manner. For example, circuitry 508 and 510 can be implemented as application specific integrated circuits (ASICs), and the ASIC chips and sensor 502 can be disposed on a common substrate including connections 504 and 506. Alternatively, the common substrate can be substrate 102 of sensor 502, and can have connections 504 and 506 defined on it via some of the processing steps used to fabricate sensor 502. Hybrid integration of ASIC chips with such a structure is straightforward. The overall cost of such hybrid integration approaches can be much lower than monolithic integration of the circuitry with sensor 502.

Figure 6A:
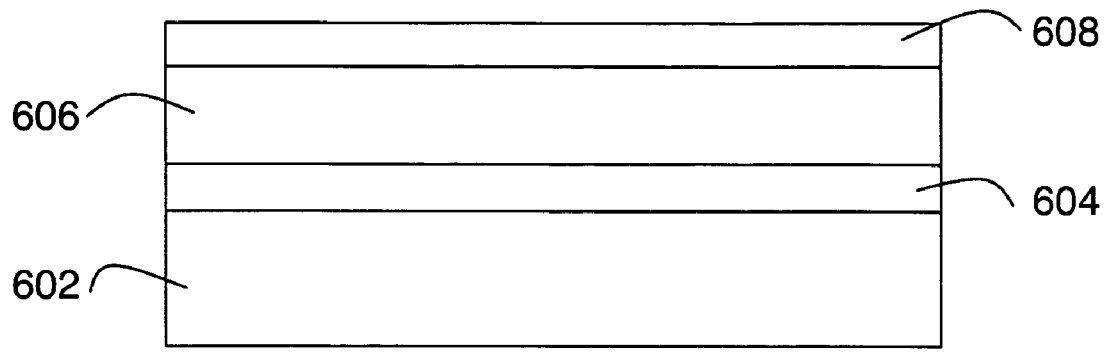
FIGS. 6a-c show a preferred sequence of processing steps for fabricating part of an embodiment of the invention.
Figure 6B:
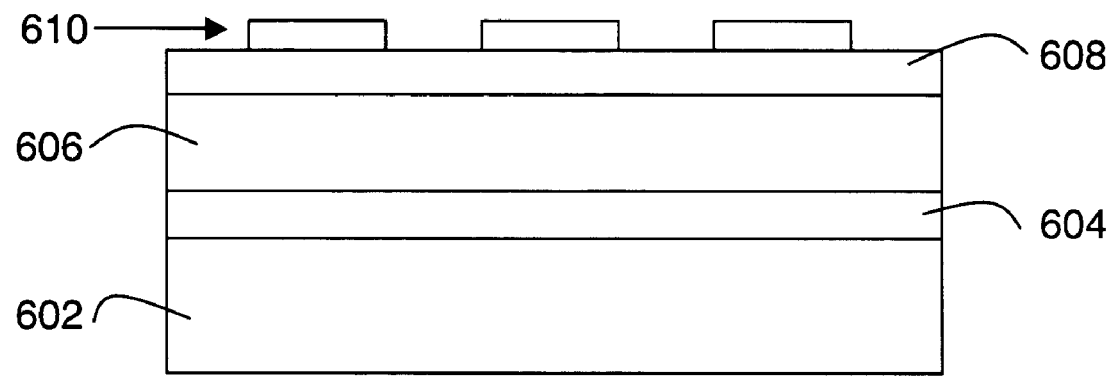
Figure 6C:
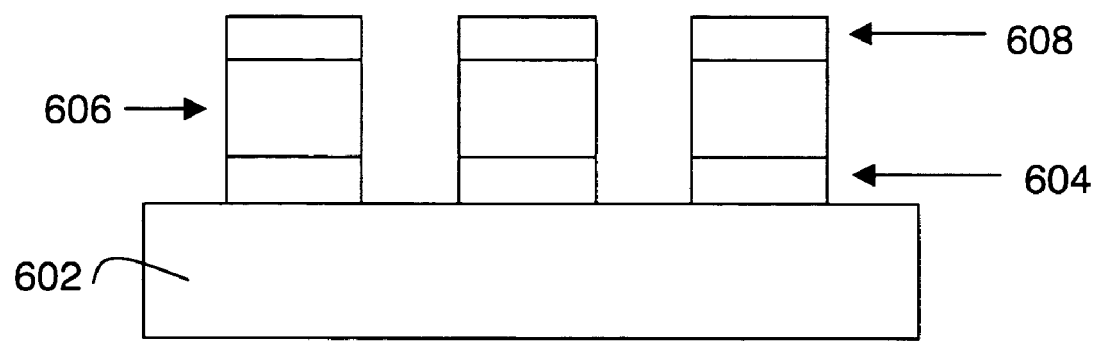

FIGS. 6a-c show a preferred sequence of processing steps for fabricating part of an embodiment of the invention. More specifically, substrate features such as electrode 110, resistors 120, 122, 124, and 126, and contact layers 130, 132, 134, and 136 on FIG. 1a are preferably fabricated with a self-aligned process. The first step of this process is deposition of an electrode layer 604 on a substrate 602, followed by deposition of a resistor layer 606 on electrode layer 604, followed by deposition of a contact layer 608 on resistor layer 606. FIG. 6a shows the result of this first step. In some cases, it is preferred to also deposit a barrier layer (not shown) after deposition of resistor layer 606 and before deposition of contact layer 608. Such barrier layers are known in the art. For example, if the contact layer is gold, and the resistor is silicon, then a Ti—W barrier layer is suitable. A barrier layer may also (or alternatively) be disposed between the substrate electrode and the resistor. Additionally, it may be advantageous in some cases to deposit an adhesion layer to enhance the adhesion between the electrode and the substrate. For example, if the electrode is gold, and the substrate is polyimide, a thin chromium layer can be used to enhance adhesion.

The second step, shown on FIG. 6b, is coating and patterning of a mask layer 610 (e.g., a photoresist, electron beam resist, etc.). To obtain the configuration of FIG. 1b, the pattern of mask layer 610 is a series of parallel lines, shown in end view on FIG. 6b. The third step is etching away the unprotected parts of layers 608, 606, and 604, to form lines in layers 608, 606, and 604, followed by removal of mask layer 610. As a result of this processing sequence, the resistor and contact layer lines are advantageously both aligned with the electrode lines. Further processing, which is also preferably self aligned with respect to contact layer 608 and resistor layer 606, can be employed to define multiple discrete resistors (each having its top contact) on each substrate electrode, as shown on FIGS. 1a-b. Alternatively, with the appropriate resistivity for the resistor layer, and a thin enough resistor layer, the resistor layer can be left continuous, and discrete contacts alone can be defined at this step of the process.

Figure 7A:
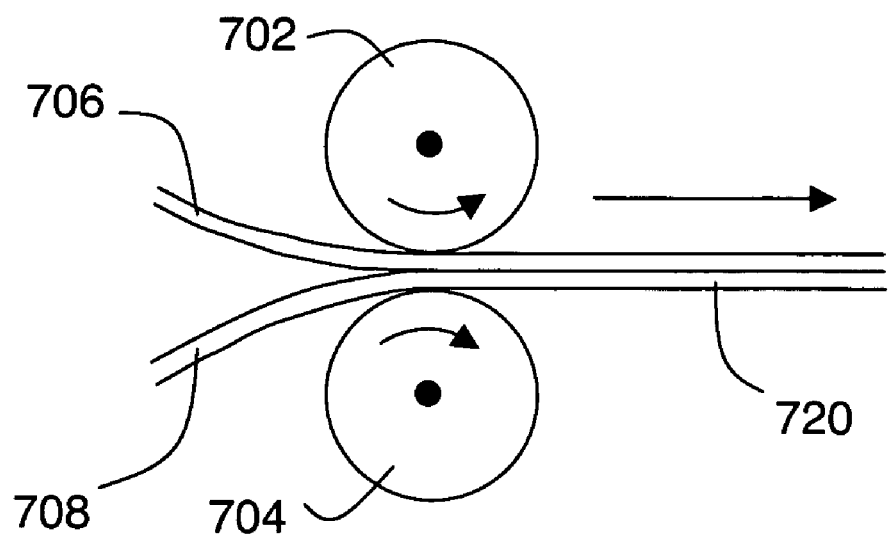
FIGS. 7a-b show bonding methods suitable for fabricating some embodiments of the invention.
Figure 7B:
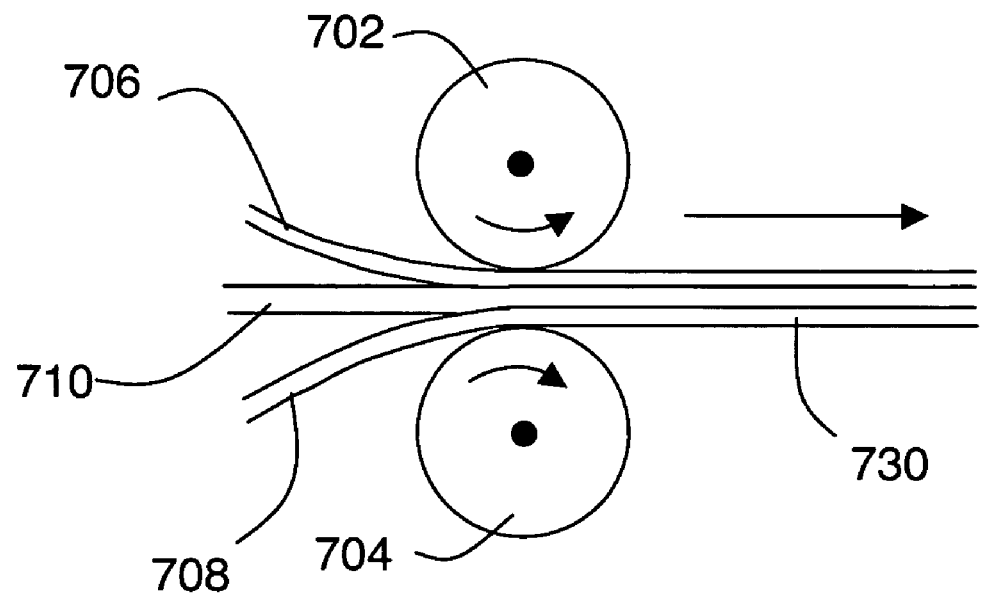

FIGS. 7a-b show bonding methods suitable for fabricating some embodiments of the invention. A significant advantage of the invention is that it allows for the possibility of fabricating large numbers of pressure sensor arrays simultaneously. More specifically, the flexibility of the substrate and membrane allows for a "roll-to-roll" fabrication model, as opposed to the significantly more costly "wafer" model entailed by having a rigid substrate.

FIG. 7a schematically shows a first roll to roll fabrication process. A flexible substrate is processed (e.g., using processes described above) to form a substrate pattern. Similarly, a flexible membrane is processed to form a membrane pattern. The patterned substrate 708 and patterned membrane 706 are bonded by passing through rollers 702 and 704 to provide a bonded structure 720. The membrane and substrate patterns combine to form pressure sensor elements in bonded structure 720 (e.g., as shown on FIGS. 1a-b and 2a-b). More specifically, a spacer (such as 106 on FIGS. 1a-b) is formed by the combination of substrate and membrane patterns. Since the substrate is flexible, the process inputs (i.e., 706 and 708) can be provided from rolls of patterned material, and the process output 720 can be taken up on a roll of bonded sensors. Patterning of the membrane and substrate and incorporation of circuitry (e.g., as shown on FIG. 5) can also be performed at the roll level. Cost is reduced by performing all processing at the roll level except for final division into discrete assembled sensors.

In a preferred embodiment, the process of FIG. 7a is used to fabricate a pressure sensor element array having a spacer which includes pressure sensitive resistors as local standoffs. More specifically, patterned substrate 708 (and/or patterned membrane 706) include pattern features that form pressure sensitive resistors acting as the spacer after bonding substrate and membrane together.

FIG. 7b schematically shows a second roll to roll fabrication process. The process of FIG. 7b is similar to that of FIG. 7a, except that a patterned spacer 710 is included as a process input, and a bonded structure 730 is basically a three layer sandwich structure having substrate, spacer and membrane. Spacer 710 can be provided as a patterned film, or can be deposited in a patterned manner on the substrate and/or the membrane. The examples of FIGS. 7a-b are only two of many ways to fabricate embodiments of the invention.

The present invention is widely applicable. In broad terms, sensors such as those described above provide an output signal from one or more pressure sensor elements. This output signal can take various forms. The output signal can be an image of a textured surface (e.g., a fingerprint image), obtained by polling some or all of the sensor elements. The output signal can also be a binary touch signal, responsive to at least one of the pressure sensor elements.

A typical use for a binary touch signal is to "wake up" a device in standby mode in response to a touch from a user. Other applications of binary touch signals include power switch systems, menu selection systems, pointer activation systems, and standby/wakeup systems.

Applications of image signals where the textured surface is a fingerprint include identification systems, security systems, motion sensing systems, and cursor control systems. Motion sensing can be accomplished using image signals by comparing two images of the same fingerprint taken at different times. Comparison of the two images will provide information on how the finger has moved. In turn, this motion information can be used for various applications, such as cursor control for a computer input device. Such comparison of images is facilitated by selecting a subset of the image points to be compared, in order to reduce the required computation time.

Some aspects of the invention can be appreciated by consideration of the following illustrative example. This example is a fingerprint sensor having the configuration shown in FIGS. 1a-b. The sensor array has 256 rows and 256 columns. The membrane and substrate are made of PET, PEN or Kapton® (a polyimide), and the spacer is a pressure sensitive adhesive. The membrane thickness is 12.5 µm, the substrate thickness is 50 µm, and the spacer thickness is 20-50 µm. The row electrodes are 100 nm thick, 35 µm wide and have a center to center spacing (i.e., pitch) of 50 µm. The column electrodes are 100 nm thick, 15 µm wide and have a pitch of 50 µm. The row and column electrodes in this example differ in order to provide increased contact area and increased alignment tolerance simultaneously. The resistors are silicon resistors having a value of 1 MΩ. A 100 nm thick gold contact layer is on top of the resistors, and a Ti—W barrier layer is between the contact layer and the resistor layer for each resistor.

The preceding description has been by way of example as opposed to limitation. Many modifications of the above examples are also included in the present invention. For example, the preceding description relates mainly to fingerprint sensing, but the invention is also applicable to sensing of any other textured surface.

The invention claimed is:

1. An imaging pressure sensor for providing an image of a textured surface, the sensor comprising:
   a) a flexible membrane conformable to the textured surface;
   b) a flexible substrate capable of being affixed to a flexible surface without breaking;
   c) at least two pressure sensor elements, wherein each pressure sensor element has an electrical resistance greater than 25 kΩ responsive to a separation between a part of the membrane and a corresponding part of the substrate; and
   d) a spacer disposed between and connected to the membrane and the substrate;
   wherein each of the separations has a corresponding non-zero nominal value determined in part by the spacer;
   wherein said substrate has a flexural rigidity $D_S$ and said membrane has a flexural rigidity $D_M$, and wherein $D_M < D_S < 10^6 D_M$.

2. The sensor of claim 1, wherein said membrane includes a layer of a material selected from the group consisting of: polyimides, aromatic fluorine polyesters, polyethersulfone, polysulfones, polyacrylates, polycarbonates, polyetheretherketone, polyethylene naphthalate, blocked isocyanates, silicone based elastomers, polyamides, polyether imides, polymethacrylates, polyolefins, poly (ethylene-acrylate) copolymers, poly(ethylene-methacrylate) copolymers, polyethylene terephthalate, polynaphthalene terephthalate, polydienes, poly(styrene-diene) block copolymers, poly(vinyl halides), polyurethanes, poly(urethane acrylates), poly(urethane methacrylates), poly(dimethyl siloxanes), and ionomers.

3. The sensor of claim 2, wherein said layer comprises particulate inclusions.

4. The sensor of claim 1, wherein said membrane is a laminate including two or more layers of differing composition.

5. The sensor of claim 1, wherein $10^{-11}$ N-m $\leq D_M \leq 10^{-7}$ N-m.

6. The sensor of claim 5, wherein $10^{-8}$ N-m $\leq D_M \leq 10^{-6}$ N-m.

7. The sensor of claim 1, wherein said substrate includes a layer of a material selected from the group consisting of: polyimides, aromatic fluorine polyesters, polyethersulfone, polysulfones, polyacrylates, polycarbonates, polyetheretherketone, polyethylene naphthalate, blocked isocyanates, silicone based elastomers, polyamides, polyether imides, polymethacrylates, polyolefins, poly(ethylene-acrylate) copolymers, poly(ethylene-methacrylate) copolymers, polyethylene terephthalate, polynaphthalene terephthalate, polydienes, poly(styrene-diene) block copolymers, poly(vinyl halides), polyurethanes, poly(urethane acrylates), poly(urethane methacrylates), poly(dimethyl siloxanes), and ionomers.

8. The sensor of claim 7, wherein said layer comprises particulate inclusions.

9. The sensor of claim 1, wherein said substrate is a laminate including two or more layers of differing composition.

10. The sensor of claim 1 wherein $10^{-7}$ N-m $\leq D_S \leq 10^{-4}$ N-m.

11. The sensor of claim 10, wherein $10^{-6}$ N-m $\leq D_S \leq 10^{-5}$ N-m.

12. The sensor of claim 1, wherein each of said pressure sensor elements provides an analog output signal or a binary output signal.

13. The sensor of claim 1, wherein each of said pressure sensor elements includes two contact electrodes disposed on said substrate and an electrically conductive region disposed on said membrane facing the two contact electrodes.

14. The sensor of claim 1 further comprising:
   a plurality of membrane electrodes disposed on said membrane and facing said substrate, wherein the membrane electrodes are substantially parallel;
   a plurality of substrate electrodes disposed on said substrate and facing said membrane, wherein the substrate electrodes are substantially parallel;
   wherein the membrane electrodes are substantially perpendicular to the substrate electrodes.

15. The sensor of claim 14, wherein each of said pressure sensor elements comprises
   a first contact including part of one of said membrane electrodes; and
   a second contact including part of one of said substrate electrodes;
   whereby each of said pressure sensor elements are addressable by a corresponding row and column.

16. The sensor of claim 15, wherein each of said pressure sensor elements further includes a component selected from the group consisting of a discrete resistor and a diode.

17. The sensor of claim 16, wherein said component is disposed on said first contact or on said second contact.

18. The sensor of claim 16, wherein an electrically conductive layer is disposed on a surface of said component facing and nominally separated from said first contact or said second contact.

19. The sensor of claim 16, wherein said component is a discrete resistor including a material selected from the group consisting of: co-sputtered metals and ceramics, tantalum oxide, polysilicon, amorphous silicon, conductive polymer composites, polymer thick film resistors, carbon nanotube composites, composite plastics, composite elastomers, and intrinsically conductive polymers.

20. The sensor of claim 1, wherein said spacer comprises a material selected from the group consisting of: silicones, polyurethanes, polyamides, polyimides, polyacrylates, polymethacrylates, poly(glycidyl ethers), poly(ethylene-acrylate) copolymers, poly(ethylene-methacrylate) copolymers, polydienes, poly(styrenediene) block copolymers, poly(vinyl halides), polyurethanes, poly(urethane acrylates), poly (urethane methacrylates), and poly(dimethyl siloxanes).

21. The sensor of claim 1, wherein said spacer defines a global cavity including all of said pressure sensor elements.

22. The sensor of claim 1, wherein said spacer defines a plurality of local cavities, each corresponding to one of said pressure sensor elements.

23. The sensor of claim 1, wherein $50 D_M \leq D_S \leq 500 D_M$.

24. The sensor of claim 1, wherein said substrate is substantially composed of a first material and said membrane is substantially composed of a second material, and wherein said first and second materials have similar elastic properties.

25. The sensor of claim 24, wherein said substrate has a thickness $t_S$ and said membrane has a thickness $t_M$, and wherein $t_M \leq t_S \leq 1000 t_M$.

26. The sensor of claim 25, wherein $t_S \leq t_M \leq 10 t_S$.

27. The sensor of claim 1, wherein said sensor is a passive device including no active electrical devices.

28. The sensor of claim 1, wherein said sensor includes at least one active electrical device.

29. The sensor of claim 1, further comprising addressing circuitry disposed remotely from said pressure sensor elements.

30. The sensor of claim 1 further comprising a body having a flexible surface to which said flexible substrate is affixed.

31. A method of making an imaging pressure sensor for providing an image of a textured surface, the method comprising:
  a) providing a flexible substrate capable of being affixed to a flexible surface without breaking;
  b) processing the substrate to form a substrate pattern;
  c) providing a flexible membrane conformable to the textured surface;
  d) processing the membrane to form a membrane pattern;
  e) providing a spacer;
  f) bonding the membrane, the spacer and the substrate together such that the spacer is sandwiched between the membrane and the substrate, and wherein the substrate pattern faces the membrane pattern;
  wherein the membrane and substrate patterns define at least two pressure sensor elements each having an electrical resistance greater than 25 kΩ responsive to a separation between a part of the membrane and a corresponding part of the substrate;
  wherein each of the separations has a corresponding non-zero nominal value determined in part by the spacer;
  wherein said substrate has a flexural rigidity $D_S$ and said membrane has a flexural rigidity $D_M$, and wherein $D^M < D_S < 10^6 D_M$.

32. The method of claim 31, wherein said substrate pattern includes resistors disposed on top of electrodes, and wherein the resistors are aligned to the electrodes by a self-aligned process.

33. The method of claim 31, wherein said bonding comprises roller-mill bonding, whereby roll-level fabrication is provided.

34. A method of making an imaging pressure sensor for providing an image of a textured surface, the method comprising:
  a) providing a flexible substrate capable of being affixed to a flexible surface without breaking;
  b) processing the substrate to form a substrate pattern;
  c) providing a flexible membrane conformable to the textured surface;
  d) processing the membrane to form a membrane pattern;
  e) bonding the membrane and the substrate together such that the substrate pattern faces the membrane pattern;
  wherein the membrane and substrate patterns define at least two pressure sensor elements each having an electrical resistance greater than 25 kΩ responsive to a separation between a part of the membrane and a corresponding part of the substrate;
  wherein each of the separations has a corresponding non-zero nominal value determined in part by a spacer formed by the membrane and substrate patterns;
  wherein said spacer comprises a local standoff corresponding to each of said pressure sensor elements, and wherein each local standoff comprises a pressure sensitive resistor.

35. The method of claim 34, wherein said substrate pattern includes resistors disposed on top of electrodes, and wherein the resistors are aligned to the electrodes by a self-aligned process.

36. The method of claim 34, wherein said bonding comprises roller-mill bonding, whereby roll-level fabrication is provided.

37. A method for sensing a textured surface, the method comprising:
  a) providing a flexible membrane conformable to the textured surface;
  b) providing a flexible substrate capable of being affixed to a flexible surface without breaking;
  c) providing at least two pressure sensor elements, wherein each pressure sensor element has an electrical resistance greater than 25 kΩ responsive to a separation between a part of the membrane and a corresponding part of the substrate; and
  d) providing a spacer disposed between and connected to the membrane and the substrate wherein each of the separations has a corresponding non-zero nominal value determined in part by the spacer;
  e) providing an output signal responsive to one or more signals from one or more of the pressure sensor elements;
  wherein said substrate has a flexural rigidity $D_S$ and said membrane has a flexural rigidity $D_M$, and wherein $D^M < D_S < 10^6 D_M$.

38. The method of claim 37, wherein said output signal comprises a textured surface image or a binary touch signal.

39. The method of claim 38, wherein said output signal is a fingerprint image.

40. The method of claim 39, wherein said fingerprint image is employed in a system selected from the group consisting of identification systems, security systems, motion sensing systems, and cursor control systems.

41. The method of claim 40, wherein said system is a cursor control system and further comprising comparing said fingerprint images taken at different times to estimate a motion of said textured surface, wherein the estimate of the motion is employed for control of a pointing device.

42. The method of claim 38, wherein said output signal is a binary touch signal, and wherein the binary touch signal is employed in a system selected from the group consisting of power switch systems, menu selection systems, pointer activation systems, and standby/wakeup systems.

* * * * *